United States Patent
Feugier (10) Patent No.: US 7,422,626 B2
(45) Date of Patent: Sep. 9, 2008

(54) METHOD AND DEVICE FOR DECLOGGING FILTER

(75) Inventor: André Feugier, Chatuzange le Goubet (FR)

(73) Assignee: Societe Franco-Belge de Fabrication de Combustible - FBFC, Courbevoie (FR)

( * ) Notice: Subject to any disclaimer, the term of this patent is extended or adjusted under 35 U.S.C. 154(b) by 820 days.

(21) Appl. No.: 10/450,363

(22) PCT Filed: Dec. 12, 2001

(86) PCT No.: PCT/FR01/03970

§ 371 (c)(1),
(2), (4) Date: Oct. 22, 2003

(87) PCT Pub. No.: WO02/47794

PCT Pub. Date: Jun. 20, 2002

(65) Prior Publication Data

US 2004/0060578 A1   Apr. 1, 2004

(30) Foreign Application Priority Data

Dec. 15, 2000   (FR) .................................. 00 16423

(51) Int. Cl.
*B01D 41/00* (2006.01)
*B01D 46/04* (2006.01)
*B01J 19/00* (2006.01)
*C01G 43/01* (2006.01)
*C01G 43/06* (2006.01)

(52) U.S. Cl. ............................. 95/279; 55/294; 55/302; 55/303; 55/350.1; 95/280; 422/105; 422/129; 422/145; 422/159; 422/187; 422/189; 423/258; 423/260; 423/261

(58) Field of Classification Search .................. 55/294, 55/302, 303, 350.1; 95/280, 279; 423/258, 423/260, 261; 422/105, 129, 145, 159, 187, 422/189
See application file for complete search history.

(56) References Cited

U.S. PATENT DOCUMENTS

| | | | |
|---|---|---|---|
| 3,845,193 A * | 10/1974 | Littlechild et al. | 423/261 |
| 3,906,081 A * | 9/1975 | Welty | 423/261 |
| 3,978,194 A * | 8/1976 | Knudsen et al. | 423/261 |
| 4,020,146 A * | 4/1977 | Knudsen | 423/261 |
| 4,624,689 A | 11/1986 | Volk et al. | |
| 4,666,472 A | 5/1987 | Klimczak et al. | |
| 4,680,038 A | 7/1987 | Titus | |
| 4,698,214 A * | 10/1987 | Linz et al. | 423/260 |
| 4,830,841 A * | 5/1989 | Urza | 423/261 |

(Continued)

FOREIGN PATENT DOCUMENTS

| EP | 0 475 062 | 3/1992 |
|---|---|---|
| EP | 0 531 657 | 3/1993 |
| SU | 1426622 | 7/1975 |

OTHER PUBLICATIONS

Chemical Engineers' Handbook, 5th Ed., Perry et al., McGraw-Hill Book Co., USA (1973), pp. 20-89 to 20-95.*

(Continued)

*Primary Examiner*—Timothy C Vanoy
(74) *Attorney, Agent, or Firm*—Davidson, Davidson & Kappel (57) ABSTRACT

A method of declogging at least one filter of a plant for manufacturing uranium oxide from uranium hexafluoride, including separating, from the wall of the filter, uranium oxyfluoride particles deposited, by a stream of inert gas such as nitrogen, injected into the filter, in a counter-currentwise direction to the flow of hydrofluoric acid.

13 Claims, 7 Drawing Sheets

U.S. PATENT DOCUMENTS 5,723,100 A * 3/1998 Carter et al. ................ 423/261
6,136,285 A * 10/2000 Feugier ..................... 423/260

OTHER PUBLICATIONS

Database WPI Section Ch, Week 199845 Derwent Publications Ltd., London, GB; AN 1998-524489 XP002174923 & JP 10 230121 A (Ryuki Eng KK), Sep. 2, 1998 Abstract.

Database WPI Section Ch, Week 198532 Derwent Publications Ltd., London, GB; AN 1985-194831 XP002174924 & JP 54 105374 A (Toyota Cent Res & Dev Lab), Aug. 18, 1979 Abstract.

РҮКАВНЫЕ фпπВtpВI Sleeve Filters, Moscow, 1977 pp. 86 through 91.

* cited by examiner

METHOD AND DEVICE FOR DECLOGGING FILTER

FIELD OF INVENTION

The invention relates to a method and a device for declogging a filter of a plant for manufacturing uranium oxide from uranium hexafluoride.

BACKGROUND INFORMATION

Uranium oxide manufacturing plants implementing a dry method of manufacturing uranium oxide from gaseous uranium hexafluoride $UF_6$ coming from a plant for enriching uranium used as a nuclear fuel with radioactive isotopes.

Such plants implementing the method of manufacturing uranium oxide from uranium hexafluoride, called dry conversion method, comprise, in an industrial embodiment which is currently the most satisfactory and most widespread embodiment, a reactor having an overall vertical arrangement into which uranium hexafluoride $UF_6$, steam and dilution nitrogen are introduced, at a temperature of 200° C. to 300° C., and uranium hexafluoride $UF_6$ is converted into uranium oxyfluoride $UO_2F_2$ according to the hydrolysis reaction:

$$UF_6 + 2H_2O \rightarrow UO_2F_2 + 4HF.$$

The conversion of uranium hexafluoride into uranium oxyfluoride by hydrolysis produces hydrofluoric acid HF in gaseous form and uranium oxyfluoride $UO_2F_2$ in powder form.

The uranium oxyfluoride $UO_2F_2$ falls and is deposited in the bottom of the reactor where it is taken up by a feed screw transferring it to the input of a rotary furnace in which the uranium oxyfluoride $UO_2F_2$ is converted into uranium oxides $UO_{2+x}$, that is to say into uranium oxides $UO_2$ with a superstoichiometric composition, the O/U ratio of the oxide varying between 2.03 and 2.66, according to the conditions for carrying out the conversion in the rotary furnace.

Hydrofluoric acid HF is evacuated through the upper part of the uranium hexafluoride conversion reactor, through filtration units which retain the uranium oxyfluoride powder $UO_2F_2$ conveyed by the gaseous hydrofluoric acid in a mixture with gases such as $N_2$ and $H_2O$ sucked through the upper part of the conversion reactor.

Generally, at least two filtration units or blocks are used, arranged in the upper part of the reactor through which the gases containing hydrofluoric acid are evacuated.

Each of the filtration units comprises a gas evacuation manifold, or head, communicating via a pipe, outside the conversion reactor, with a plant enabling the gases to be routed toward a safety filter located outside the reactor downstream of the gas routing plant, arranged in a hot box, and toward a unit for recovering hydrofluoric acid.

Inside the conversion reactor, the filtration units comprise a set of filters, or filter cartridges, each one comprising a filtering wall of overall cylindrical shape placed in the upper part of the conversion reactor with its axis vertical.

The filters, or filtering cartridges, of each of the filtration units rest, and are fastened, via an upper flange, onto a plate of the filtration unit arranged horizontally and separating the manifold or head of the filtration unit from the internal volume of the reactor in which the chemical reaction forming uranium oxyfluoride takes place.

The gases, loaded to a greater or lesser degree with powdered uranium oxyfluoride, come into contact with the outer surface of the filtering cartridges and, after separation of the powdered uranium oxyfluoride, cross the wall of the filtering cartridge thereby entering the head of the filtration unit. The powdered uranium oxyfluoride stopped by the outer wall of the filtration unit is able to fall back by gravity into the bottom of the reactor where it is taken up by the feed screw for conveying the powder.

The tubular filtration walls of the filtering cartridges, which generally consist of compressed and sintered particles or fibers, have pores to allow the passage of gases containing hydrofluoric acid, the size of which is less than the size of the uranium oxyfluoride particles, so as to stop all the solid particles which may be conveyed by the gases.

Some of the uranium oxyfluoride particles in powder form are deposited on the outer surface of the tubular wall of the cartridge, such that the filters gradually clog up during plant operation. Passage of the mixed hydrofluoric acid and gases through the wall of the filters occurs with an increasing pressure drop which is incompatible with continuous operation of the plant.

It is therefore necessary to declog the walls of the filtering cartridges periodically and sufficiently frequently.

This declogging is performed by injecting, inside the filtering cartridges, counter-currentwise with respect to the direction of flow of the gases containing the hydrofluoric acid, an inert declogging gas such as nitrogen.

The declogging nitrogen must be delivered into the filtering cartridges with an overpressure of about 2.5 bar and at a temperature of about 130° C., the temperature in the conversion reactor being about 300° C. and the temperature of the gases at the reactor outlet being about 200° C. to 300° C.

The declogging nitrogen which is contained in a storage tank is delivered to the filtration units, via the gas routing plant located above the conversion reactor. This gas routing plant is arranged inside a heated chamber, whose internal temperature is about 150° C.

Valves are arranged inside the heated chamber, in particular three-way valves, making it possible, on the one hand, for the gases containing the hydrofluoric acid to pass to the safety filter and the recovery plant, during the phases of normal operation of the filtration unit and, on the other hand, for the declogging nitrogen to pass in the opposite direction to the gas flow, during the declogging phases.

The valves withstand high temperatures and, because they operate at their upper temperature limit, their use and their maintenance are complex and expensive.

To allow continuous operation of the plant, declogging is carried out on one of the filtration units while the second filtration unit alone evacuates the gases containing the hydrofluoric acid produced in the reactor. As a result, during the declogging phases, the filtration unit remaining in operation must evacuate a gas flow which is roughly twice its usual operational flow. Furthermore, the flow of declogging nitrogen, which is delivered into the second filtration unit, to the inside of the conversion reactor, must be evacuated, which further increases the gas flow which must be evacuated by the filtration unit remaining in operation.

In one known embodiment of the filtration units of a uranium hexafluoride conversion reactor, each of the filtration units comprises eight filtering cartridges which are distributed in the plane of the horizontal plate for supporting the filters separating the head for recovering hydrofluoric acid from the internal volume of the reactor.

Declogging nitrogen is injected into the head through the pipe for evacuating gases containing hydrofluoric acid, in a region located in the central part of the head, that is to say, directly above the central part of the filter support plate. The result of this is that the jet of declogging nitrogen which is directed to the central part of the plate and to the filters carried by this central part performed preferential declogging of the filters located in the central part. These filters are perfectly declogged while the filters located on the periphery of the plate supporting the filtration unit are not sufficiently declogged. These filters become fouled, so that the pressure increases and operation of the conversion plant is disturbed, the gases passing in a preferential manner through the filters located in the central part, which are efficiently declogged.

SUMMARY

The aim of the invention is therefore to provide a method of declogging at least one filter of a plant for manufacturing uranium oxide from uranium hexafluoride, comprising a reactor in which gaseous hexafluoride $UF_6$ and steam are injected, uranium oxyfluoride $UO_2F_2$ in powder form and gaseous hydrofluoric acid HF are formed, uranium oxyfluoride $UO_2F_2$ conveyed by gases containing gaseous hydrofluoric acid HF is separated at the outlet of the reactor, in at least one filtration unit arranged on an outlet part of the reactor, comprising at least one filter having a tubular filtration wall arranged with its axis vertical, and hydrofluoric acid is evacuated to the outside of the reactor, the declogging of the filter consisting in separating, from the wall of the filter, uranium oxyfluoride particles deposited, by a stream of inert gas such as nitrogen, injected into the filter, in a counter-currentwise direction to the flow of hydrofluoric acid, this method allowing performance of efficient declogging, by keeping in operation the filtration unit on which is arranged the filter on which the declogging is carried out, with simple means for routing gases and a small amount of inert declogging gas.

For this purpose, inert gas is injected along the axis of the wall of the filter in the form of a jet with a velocity greater than 300 m/s, for a duration of less than 1 second.

BRIEF DESCRIPTION OF THE DRAWINGS

For the invention to be better understood, a plant for manufacturing uranium oxide by the dry conversion method and a declogging device making it possible to implement the method of the invention will be described, by way of example, with reference to the appended figures, in comparison to a device making it possible to implement the declogging method according to the prior art.

DETAILED DESCRIPTION

Figure 1:
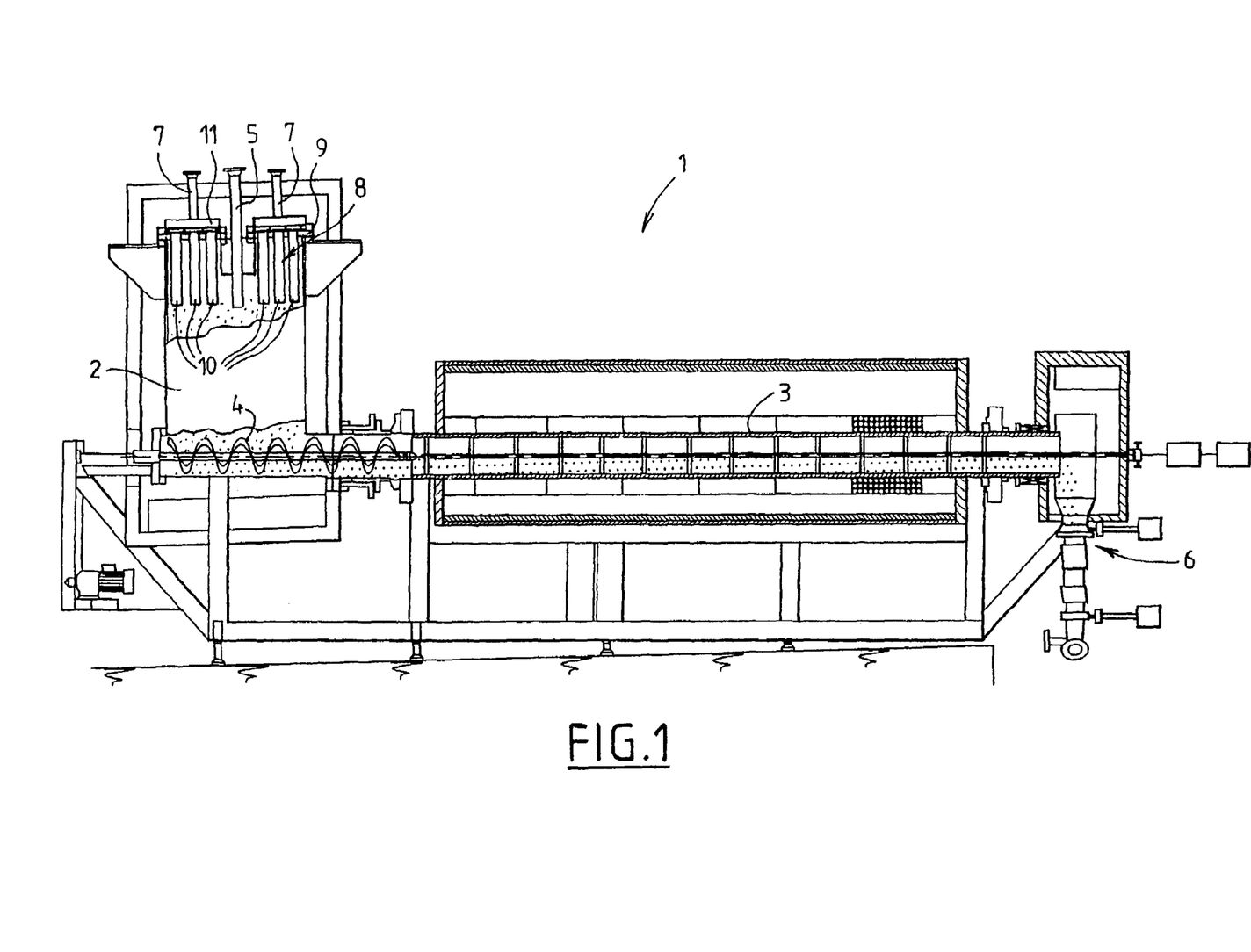
FIG. 1 is an overall view in elevation and in vertical section of a plant for manufacturing uranium oxide by the dry conversion method.

FIG. 1 illustrates a uranium oxide manufacturing plant generally denoted by the reference 1 and comprising a reactor 2 for converting uranium hexafluoride into uranium oxyfluoride and a rotary furnace 3 for converting uranium oxyfluoride into uranium oxide.

The reactor 2 has an enclosure generally placed in a vertical arrangement, in which emerges a pipe 5 for injecting reagent gases $UF_6$ and $H_2O$ and a dilution gas which may be an inert gas such as nitrogen, inside the enclosure of the reactor 2.

Hydrolysis of uranium hexafluoride $UF_6$ by steam occurs in the reactor 2, so as to form powdered uranium oxyfluoride which falls to the bottom of the reactor 2 and which is taken up by a conveying screw 4 which conveys the uranium oxyfluoride in powdered solid form formed in the reactor 2 to the input of the rotary furnace 3 in which the uranium oxyfluoride is converted into uranium oxide (mainly $UO_2$).

The hydrolysis reaction of uranium hexafluoride produces gaseous hydrofluoric acid HF inside the reactor 2, the gaseous hydrofluoric acid being evacuated to the outside of the uranium hexafluoride conversion reactor 2 by two vertical recovery pipes 7, each one connected to a filtration unit 8 of the reactor 2. In this particular embodiment described, each of the filtration units 8 comprises eight filtering cartridges such as 10 comprising a tubular filtering wall arranged with its vertical axis inside the reactor 2, in the outlet part of the reactor.

Figure 2:
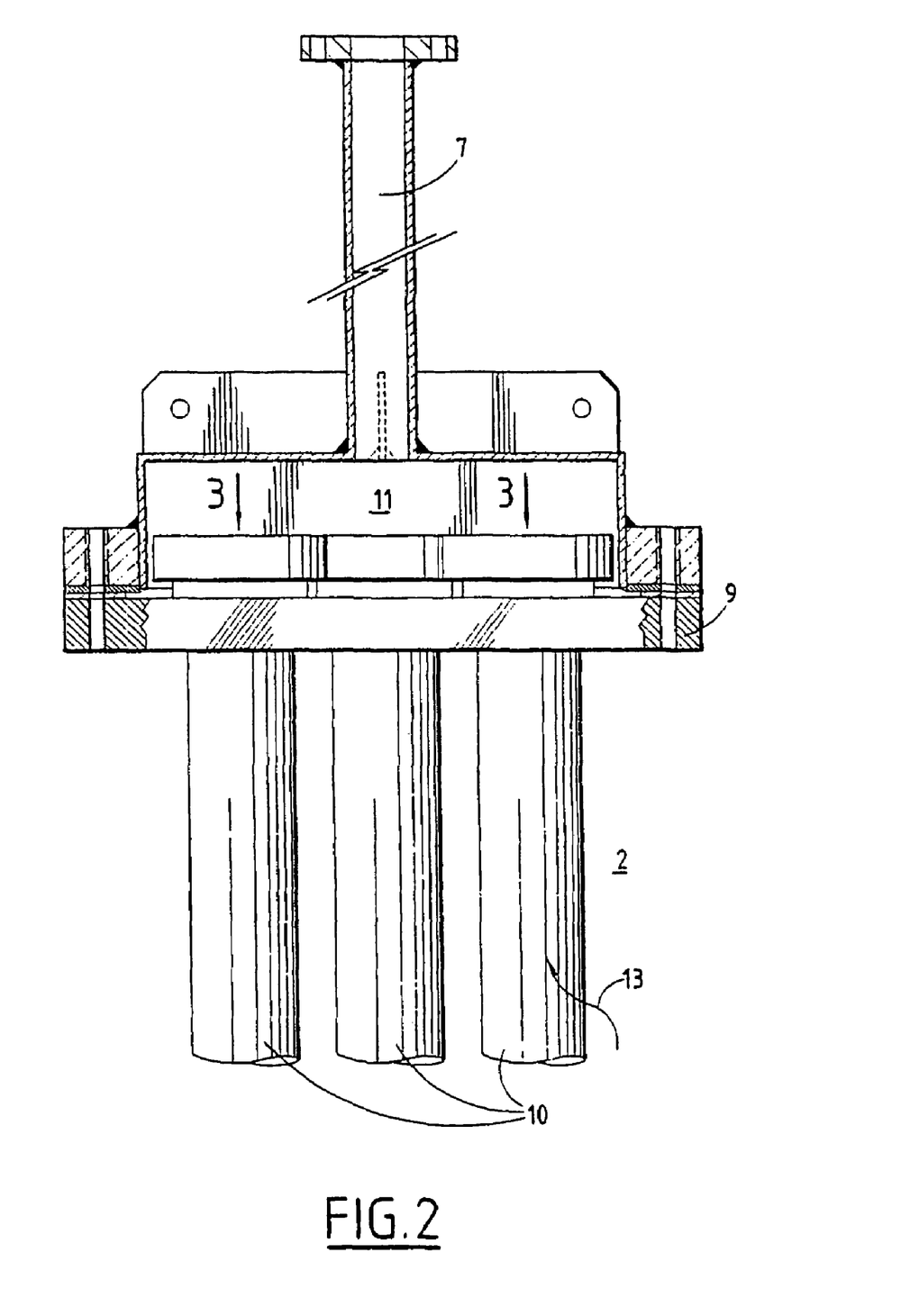
FIG. 2 is a view in partial vertical section of a filtration unit of the reactor for converting uranium hexafluoride into uranium oxyfluoride.
Figure 3:
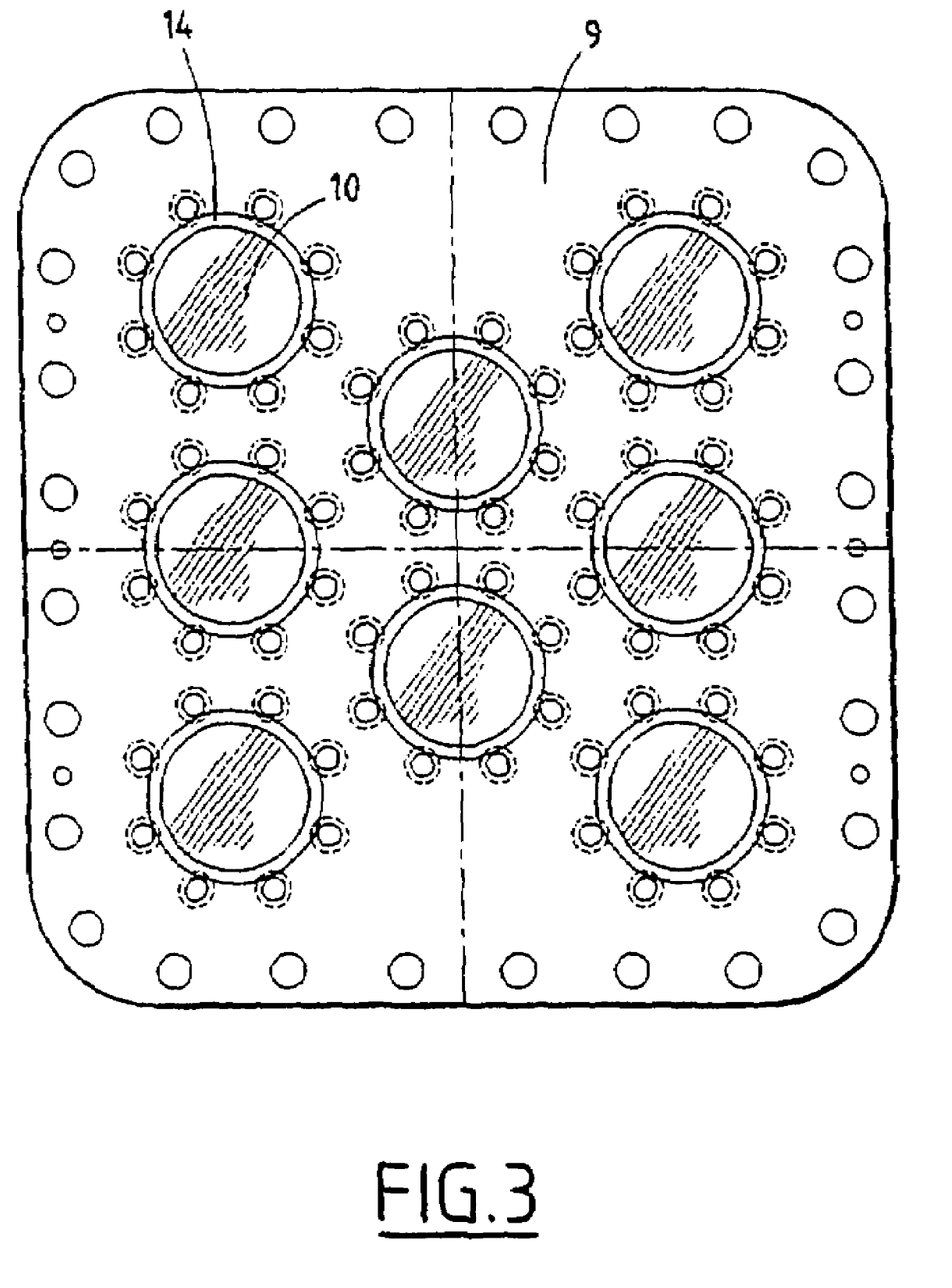
FIG. 3 is a top view, along 3-3 of FIG. 2, of the plate supporting the filtering cartridges of the filtration unit.

As illustrated in FIGS. 2 and 3, the filtering cartridges 10 of each of the filtration units 8 are fastened to a horizontal plate 9 of the filtration unit which is traversed by through-passages of the filtering cartridges 10 and which separate a manifold or head 11 of the filtration unit, in which the recovery pipe 7 emerges, from the internal volume of the reactor 2. Each of the filtering cartridges 10 or filter of the filtration unit 8 is seal fastened to the upper surface of the plate 9, via a fastening flange. Each of the filtration cartridges 10 is closed at an end placed inside the reactor 2 and open at an opposite end emerging in the head 11 of the filtration unit.

The gas stream must cross the filtering wall of the filtration cartridges 10 in order to pass from the enclosure of the reactor 2 to the head 11 communicating with the gas recovery pipe 7.

As illustrated in FIG. 2, the gas stream 13 which crosses the filtration wall 12 of the filtering cartridge is separated from the uranium oxyfluoride powder which cannot cross the pores of the wall 12. Some of the uranium oxyfluoride powder is, however, deposited on the wall 12 of the filtering cartridge 10, such that the filtering cartridge gradually clogs up during operation of the reactor.

Figure 4:
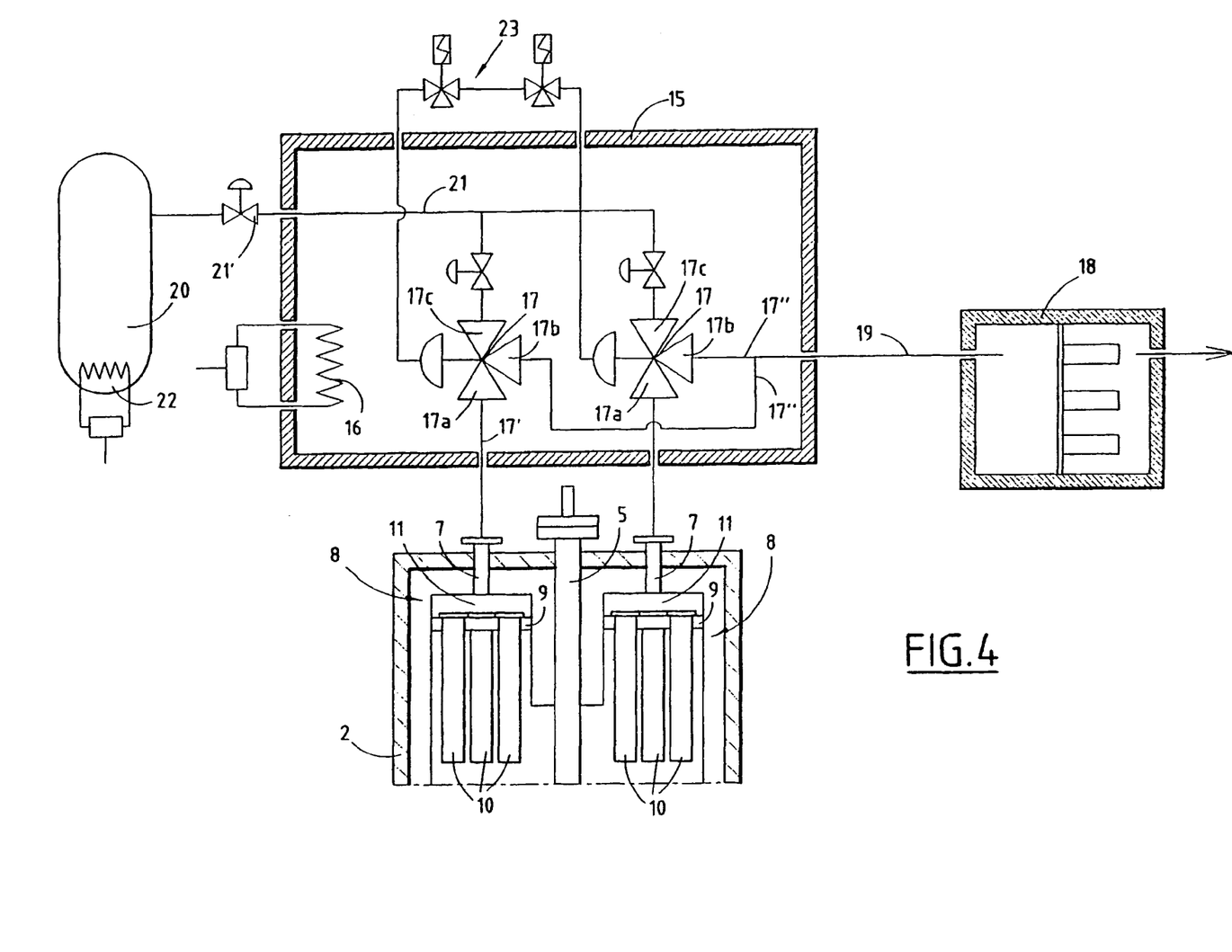
FIG. 4 is an outline diagram showing the gas routing and flow arrangement, allowing gas to enter and exit the upper part of the conversion reactor, for a reactor comprising a declogging device according to previous designs.

In FIG. 4, on the one hand, an arrangement for supplying the reactor 2 with reagent gas and with dilution gas together with an arrangement for removing the gases formed or present in the reactor 2 and, on the other hand, an arrangement making it possible to declog the filtering cartridges 10 of the filtration units 8 of the reactor 2 are illustrated schematically for a plant.

The reactor 2 comprises two filtration units 8, each one of the units itself comprising eight filtration cartridges distributed over the cross section of the filtration unit, as provided in FIG. 3 showing the distribution of the parts for supporting and fastening the filtering cartridges on the plate 9 for fastening filtering cartridges of a filtration unit 8. The plate 9, of substantially square shape, comprises eight through-openings for a filtering cartridge, around each one of which a filtering cartridge rests by a flange 14 fastened to an upper end. The eight through-openings of the eight filtering cartridges are arranged on the plate 9 along a central row comprising two cartridges whose axes are placed in a central plane of the plate 9 and two outer rows arranged on each side of the central row comprising three cartridges, whose axes are placed in two planes parallel to the central plane containing the axes of the central row. The plate 9 closes the head 11 of the filtration unit in its lower part, and the gas recovery pipe 7 is arranged along the vertical axis of the filtration unit and thus emerges directly above the central part of the plate 9; between the emerging parts of the two filtering cartridges arranged in the central row.

In FIG. 4, the upper part of the reactor 9 for converting uranium hexafluoride into uranium oxyfluoride together with an arrangement for evacuating gases and an arrangement for declogging the filters of the filtration units, according to the prior art, are shown.

Two filtration units 8 placed in parallel and each comprising a pipe 7 for evacuating gas containing hydrofluoric acid to the outside of the reactor 2 are arranged in the upper part of the reactor 2. A heated chamber 15 comprising an insulating wall and a heating resistor 16 making it possible to keep the temperature inside the chamber at about 150° C., is placed above the reactor 2.

Two three-way valves 17, each one of which is connected via a first way 17a and a pipe 17' to the evacuation pipe 7 of a filtration unit 8, emerging in the head 11 of the filtration unit and by a second way 17b and a pipe 17" to a pipe 19 for evacuating gases to the auxiliary filter 18, are arranged inside the chamber 15.

The third way 17c of the three-way valves 17 is connected via a pipe 21, on which an isolation valve 12' is placed, to a tank 20 containing pressurized nitrogen which may be used to declog the filters 10 of the filtration units 8 by the method according to previous designs which will be briefly described below.

The tank 20 contains nitrogen at a pressure of 2.5 bar heated to 130° C. by a heating resistor 22.

During normal operation of the conversion reactor 2, uranium hexafluoride $UF_6$, steam and dilution nitrogen are introduced inside the reactor 2 via the pipe 5.

Uranium oxyfluoride $UO_2F_2$ and hydrofluoric acid HF, which is removed by the pipes 7 to the output of the two filtration units 8, which are connected to the three-way valves 17 controlled by the control circuit 23, are formed inside the reactor 2. The valves 17 are then controlled so that the acid gas passes through the first and the second ways of the three-way valves in order to be delivered to the auxiliary filter 18, then recovered.

The declogging method which may be implemented by using the plant illustrated in FIG. 4, is a method known as off-line, that is to say a method in which the filtration unit to be declogged are placed outside the circuit. To do this, the three-way valves 17 of the filtration unit to be declogged are controlled in order to put the third and the first ways of the three-way valve 17 in communication. As a result, the gases produced in the reactor 2 can no longer be evacuated by the filtration unit 8 which is being declogged and the corresponding evacuation pipe 7.

Declogging is performed by opening the isolation valve 21' of the nitrogen feed line, so as to deliver a jet of pressurized declogging nitrogen at a temperature of 130° C. into the connection pipe 17' and into the evacuation pipe 7 of the filtration unit 8 which is being declogged.

The declogging nitrogen is injected into the head 11 of the filtration unit, directly above the filtering cartridges 10 located in the central part of the plate 9 of the filtration unit. As a result, both central filtering cartridges of the filtration unit may be sufficiently declogged, while the six furthermost cartridges are only partially declogged.

Furthermore, in order to declog a filtration unit, it is necessary to inject a volume of declogging nitrogen into the filtration unit which is relatively high and generally about 50 liters (at atmospheric pressure), during the declogging which is performed by opening the isolation valve of the nitrogen tank for a duration of about 0.5 seconds.

As a result, the second filtration unit still in operation during the declogging must evacuate not only all the gases produced in the reactor 2 but also the additional stream of declogging nitrogen injected into the first unit, which causes a general overpressure in the reactor.

The known method of previous designs therefore has reduced efficiency with regard to declogging the filters away from the central part of the filtration unit.

Furthermore, performing off-line declogging on a filtration unit requires abnormal operation of the second filtration unit and of the corresponding circuit for evacuating the gases containing the hydrofluoric acid.

According to the invention, a new declogging method is provided, which allows keeping the filtration unit which is being declogged in operation during the declogging.

Such a method is called an on-line method.

Figure 5:
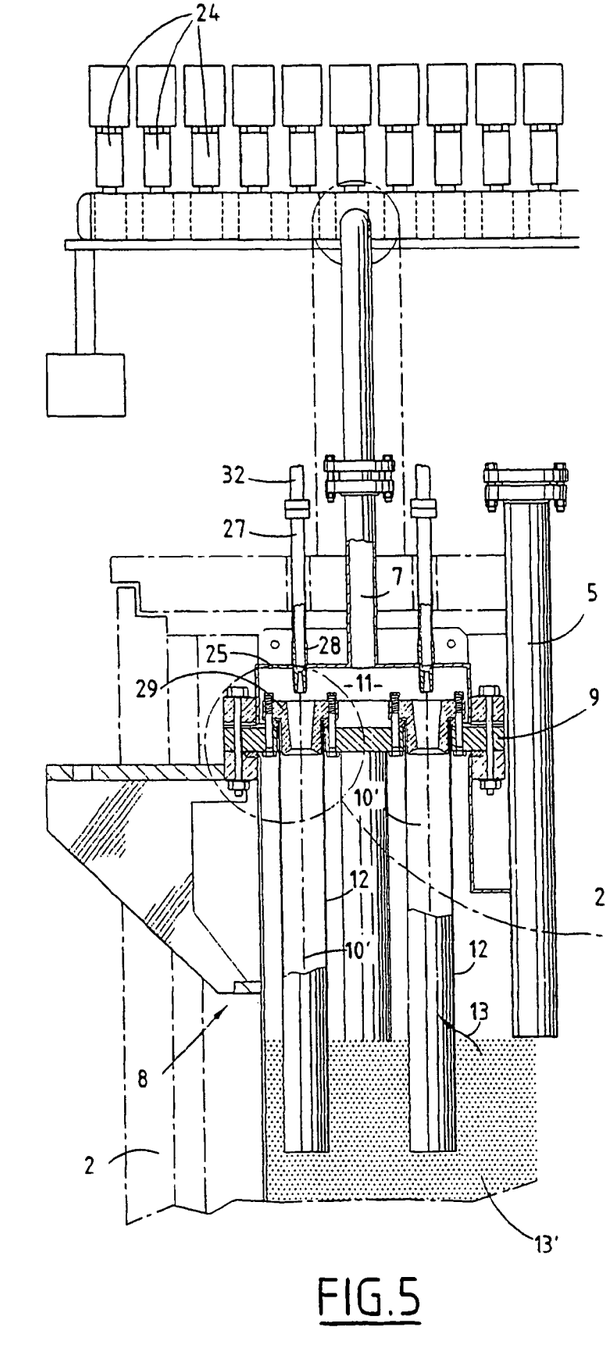
FIG. 5 is a view in vertical section of a filtration unit of a uranium hexafluoride conversion reactor comprising a declogging device according to the invention.
Figure 6:
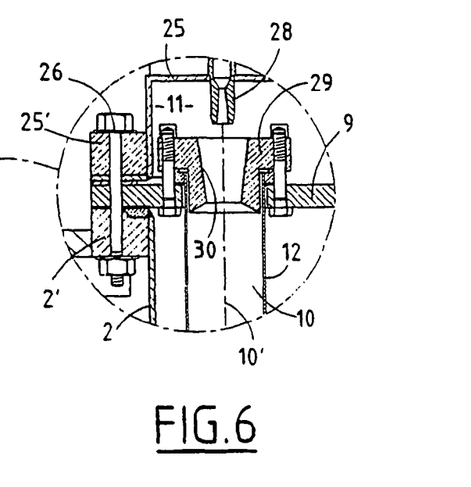
FIG. 6 is a detailed view of part of FIG. 5 showing the declogging device for implementing the method according to the invention.

FIGS. 5 and 6 show a filtration unit of a reactor for converting uranium hexafluoride into uranium oxyfluoride equipped with a declogging device making it possible to implement the method according to the invention.

The corresponding elements of the plant illustrated in FIGS. 5 and 6, on the one hand, and in FIGS. 1 to 4, on the other hand, are denoted by the same references.

The filtration units 8 of the plant illustrated in FIGS. 5 and 6 are produced in the same manner as the filtration units described with respect to FIGS. 2 and 3. These filtration units each comprise eight filters or filtering cartridges 10 supported by a plate 9 traversed by through-openings for filtering cartridges, the plate 9 separating the head or manifold 11 of the filtration unit in which the gas recovery pipe emerges from the internal space of the reactor 2 in which the filtering cartridges 10 are introduced.

During normal operation of the conversion reactor 2, gaseous hydrofluoric acid and other gases (steam, hydrogen, etc.) cross the porous wall 12 of the filtering cartridges 10, in the internal space of the reactor, as illustrated by the arrow 13, and particles 13' of uranium oxyfluoride in powder form fall back into the bottom of the reactor 2. However, progressive clogging of the wall 12 of the filtering cartridges occurs, which requires periodic declogging of the cartridges.

According to the invention, declogging is performed by one or more very brief successive jets of declogging nitrogen delivered along the axis of each of the filtering cartridges 10, at a sonic velocity. Declogging nitrogen is injected while keeping the filtration unit which is being declogged in operation, that is to say, while maintaining the passage of mixed hydrofluoric acid and gases through the filtration unit for their evacuation through the pipe 7 connected to the head 11 of the filtration unit.

The head 11 of a filtration unit 8 comprises a head wall 25 which is fastened, in a parallel arrangement, above the plate 9 separating the head 11 from the internal volume of the reactor 2, via a flange 25' resting on the plate 9. Screw and bolt assemblies 26 make it possible to fasten and clamp, one against the other, the flange 25' of the wall 25 of the head, a peripheral part of the plate 9 supporting the filters 10 and a flange 2' secured to the upper part of the wall of the reactor 2. Seals are inserted between the flanges clamped one against the other on each side of the plate 9. The wall 25 of the plate 11 carries a set of eight nozzles 28 for injecting declogging nitrogen, each one along the axis 10' of a filtering cartridge 10. Each of the nozzles 28 may be connected by a pipe 27 to one solenoid valve of a set of solenoid valves 24 for distributing declogging nitrogen, valves fastened to a support above the filtration units 8.

Each of the nozzles 28 for injecting declogging nitrogen is associated with a filtering cartridge 10 and placed so that the axis of the nozzle 28 is directed along the axis 10' of the filtering cartridge, the injection end of the nozzle 28 being slightly above the upper surface of a flange 29 for supporting and fastening the filtering cartridge 10 to the upper surface of the plate 9 of the head 11.

The pipe of the nozzle 28 may be cylindrical or of convergent-divergent shape; the nozzle may be placed in the head 11, immediately upstream and in a coaxial position with respect to an opening 30 traversing the support flange 29 of the filtering cartridge 10 forming a venturi, that is to say a convergent-divergent pipe providing additional acceleration of a jet of declogging nitrogen delivered under pressure into the nozzle 28 for a very short duration. Thus, declogging is performed by a pulsed jet at sonic velocity, that is to say at a velocity substantially equal to or slightly greater than the speed of sound.

In a another exemplary embodiment, the nozzle may be inserted inside the filtering cartridge and placed in a central region half way up the filtering cartridge. Thus penetration of the cleaning gas jet into the filter cartridge is ensured.

The various methods of feeding the declogging nozzles 28 of the filtration units with respect to FIGS. 7, 8 and 9 will be described.

The different embodiments of the system for feeding the declogging nozzles make it possible to feed the declogging nozzles in groups or individually. The declogging nozzles, which are individual nozzles for each of the filtering cartridges, may therefore be fed simultaneously or successively depending on the feed system chosen.

Typical conditions for producing and operating an arrangement for declogging a filtering cartridge consisting of a nozzle 28 and a venturi 30 will be given below.

For a nozzle having a convergent-divergent pipe, the diameter of the neck of the nozzle may be about 10 mm. The angle of opening of the divergent part may be between 5 and 15° and, for example, about 10°.

The declogging frequency is adjusted according to the increase in pressure drop of the reactor and the duration of opening of the declogging valve 24 connected to the nozzle 28 by the pipe 27 may be of 0.1 seconds to 0.5 seconds, for example 0.14 seconds or even 0.2 seconds.

The excess pressure of the declogging nitrogen in the nitrogen storage tank is from 2 to 10 bar, and in an exemplary embodiment 6 bar.

For a nitrogen pressure of 6 bar and a nozzle having an orifice of about 10 mm, the volume of nitrogen injected into each of the decloggers is 10_liters, for a duration of 0.14 seconds, and 15 liters for a duration of 0.2 seconds. It should be noted that the volumes of declogging nitrogen injected during each of the declogging operations by pulsed jet are substantially less than the volume injected during a declogging operation according to previous systems.

The nozzle is produced such that the velocity of the gas jet injected at the output of the venturi 30 is greater than 330 m/s, which locates the jet in the region of sonic velocities.

Depending on the type of filter used and the operating mode of the conversion plant, the characteristic parameters of the pulsed jet, that is its velocity and its duration, are able to be different from the values given above.

However, in all cases, the velocity of the declogging jet at the input of the filtration cartridge will be greater than 300 m/s and the duration of injection of the jet at sonic velocity will be less than 1 second.

Figure 7:
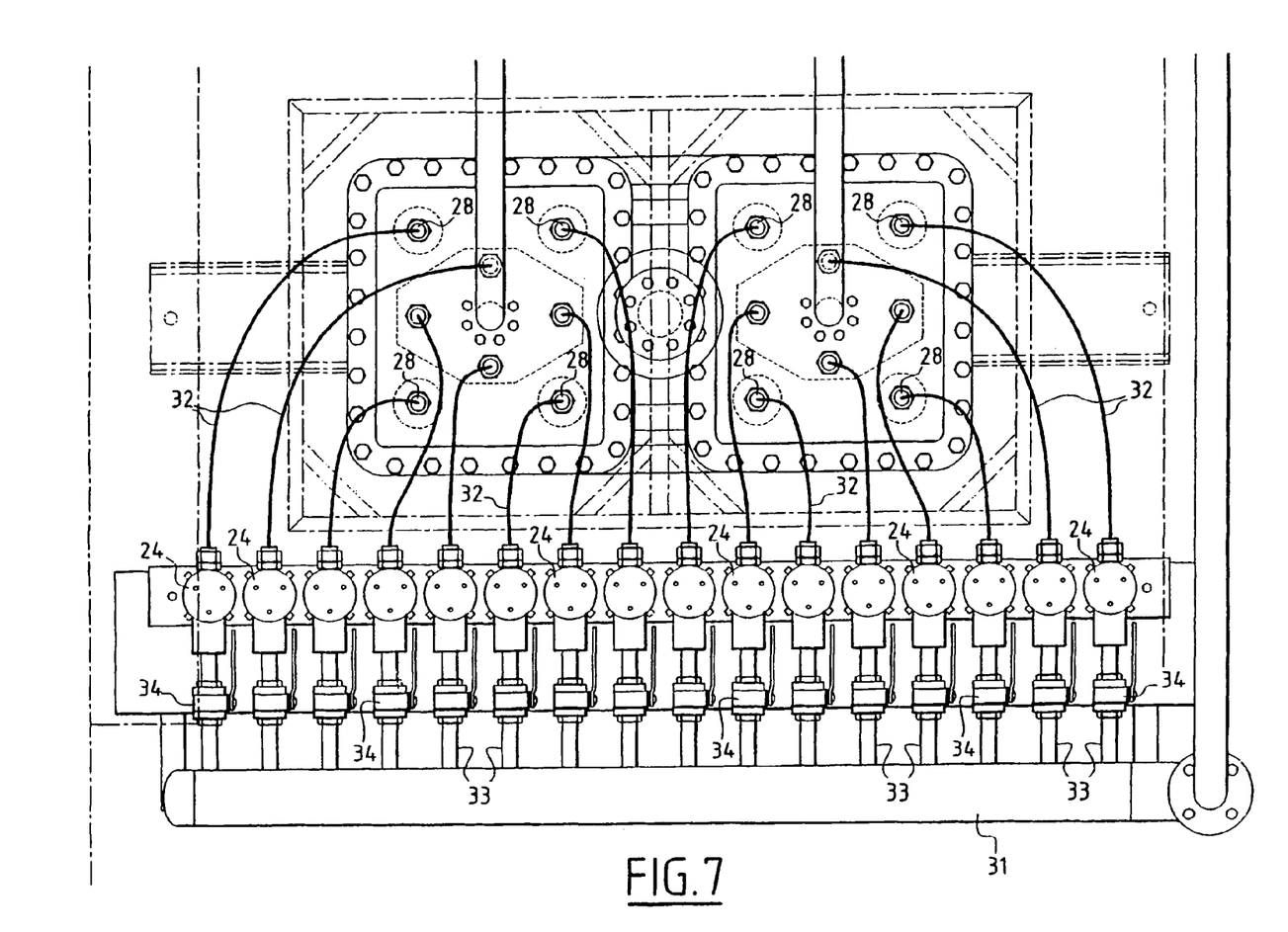
FIGS. 7, 8 and 9 are plane views of three different embodiments of the declogging device according to the invention.
Figure 8:
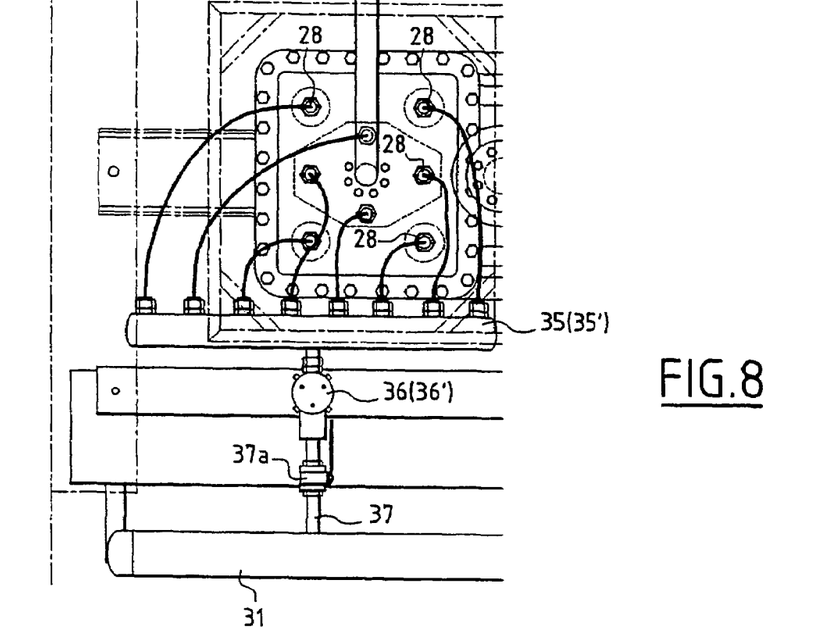
Figure 9:
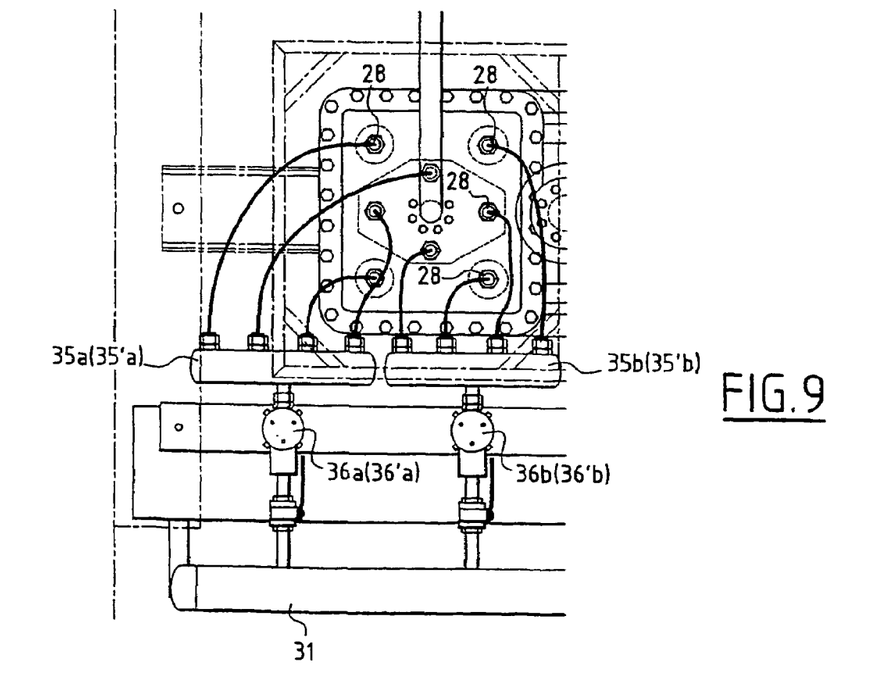

As has been indicated above, the nozzles and therefore the declogging pipe may be fed in different ways which are described with respect to FIGS. 7, 8 and 9.

In FIGS. 7, 8 and 9, the corresponding elements bear the same references and the corresponding elements illustrated in FIGS. 7, 8 and 9 on the one hand and in FIG. 4 on the other hand are also denoted by the same references.

In all cases, within the scope of the method according to the invention, a plant is used which comprises an arrangement for evacuating hydrofluoric acid mixed with steam, hydrogen and dilution nitrogen and an arrangement for distributing declogging nitrogen which are simpler than those which have been described for previous systems, with respect to FIG. 4.

In FIG. 7, a set of arrangements for distributing declogging nitrogen into the nozzles 28 of a declogging plant according to the invention, as described above with regard to FIGS. 5 and 6, is illustrated.

The arrangement for distributing nitrogen illustrated in FIG. 7 is made so that the nitrogen may be delivered successively into each of the nozzles 28 for the successive declogging of each of the filtering cartridges 10 of each of the filtering units of the plant.

Two variants of the nitrogen distribution arrangement making it possible to feed all the declogging nozzles 28 of the filters of a filtration unit or the declogging nozzles of only some of the filters of a filtration unit (for example half of the filters) simultaneously will be described with respect to FIGS. 8 and 9, respectively.

As illustrated in FIG. 7, the arrangement for distributing nitrogen into the nozzles 28 comprises a nitrogen tank 31 consisting of a large-diameter insulated pipe.

The nitrogen tank 31 with a 20 to 30 liter capacity contains nitrogen at a pressure which may be between 2 and 10 bar and which is, for example, 6 bar and a temperature of about 130° C. Solenoid valves 24, distributing nitrogen into each of the pipes 27 feeding a nozzle 28 via a hose 32, are placed on one side of the pipe forming the tank 31.

For the embodiment illustrated in FIG. 7, sixteen solenoid valves 24, each one associated with one of the sixteen nozzles for declogging the filters of the two filtration units, are shown. Each of the solenoid valves 24 is connected to the nitrogen tank 31 via a pipe 33 on which a manual stop valve 34 is arranged, optionally enabling one or more valves of the nitrogen tank to be isolated.

The solenoid valves 24 may be automatically controlled in sequence, in order to feed declogging nitrogen to each of the nozzles 28 in succession, for a predetermined duration of, for example, between 0.1 and 0.5 seconds.

For the embodiment of the distribution arrangement illustrated in FIG. 8, a single solenoid valve 36 (or 36'), connected to the nitrogen tank 31 by a pipe 37, on which a manual stop valve 37a is arranged, feeds a manifold 35 (or 35') with nitrogen, to which manifold the pipes 27 feeding the eight declogging nozzles 28 of a filtration unit are connected by hoses 38. The declogging nozzles 28 of the filters of the two filtration units are fed with nitrogen from two solenoid valves 36 and 36', each one associated with a filtration unit, which valve may successively be controlled for their opening and the provision of nitrogen to each of the manifolds 35 and 35', in succession.

In FIG. 9, a nitrogen distribution arrangement is shown according to a second embodiment which comprises, for each of the two filtration units, two solenoid valves 36a and 36b (or 36'a and 36'b), each one connected to a manifold 35a and 35b (or 35'a and 35'b) to which the pipes 27 of four nozzles 28 of four filters of a filtration unit are connected via hoses. The distribution assembly therefore comprises four solenoid valves which may be automatically controlled in succession, in order to successively declog the filters 10, for each set of four filters of a filtration unit.

More generally, it is possible to design nitrogen distribution plants making it possible successively to declog sets of n filters out of the N filters of a filtration unit of a reactor for producing uranium oxyfluoride.

It should be noted that, even when simultaneously declogging the eight cartridges 10 of a filtration unit or four cartridges or more generally n filtering cartridges, declogging is performed individually in each of the filtering cartridges, unlike the declogging according to other systems.

Furthermore, each of the filtering cartridges is individually declogged without stopping the evacuation of the hydrofluoric acid by the filtration unit. In particular, it is not necessary to use an arrangement for routing evacuated gases such as a three-way valve. While the declogging nitrogen is being injected for a very short duration, this injection provides a very brief temporary stop of the evacuation of the gases in the filtering cartridges, the injected declogging nitrogen creating a shockwave.

The evacuation of gases starts soon after injection of the declogging gases, through the venturis 30 forming the gas outlets from the filtering cartridges 10.

In all cases, the method according to the invention makes it possible to obtain efficient and uniform declogging of each of the filters of the filtration unit by use of an on-line method, that is to say without interrupting the evacuation of the hydrofluoric acid mixed with the steam and dilution nitrogen and hydrogen to the outside of the reactor.

For individual successive declogging, or declogging in groups of eight, four or n filters of a filtration unit comprising N filters, where n<N, evacuation of the gases is performed completely continuously, through the filtering cartridges in which declogging is not carried out, during the very short duration of the pulsed declogging.

The invention is not limited to the embodiments which have been described.

It is possible to use an arrangement for injecting inert declogging gas other than those which have been described, in order to obtain a jet of inert declogging gas at sonic or slightly supersonic velocity producing a shockwave inside the filter providing very good declogging by detaching the particles retained on the wall 12 of the filters.

Instead of nitrogen, any other inert gas such as argon may be used, in order to perform declogging by pulsed jet at sonic velocity.

It is possible to use an arrangement for distributing and routing the declogging gas other than the arrangement described.

The invention is applicable to any uranium oxide production plant comprising a reactor for converting uranium hexafluoride into oxyfluoride having an outlet part on which filtration units are arranged, each one comprising one or more filters in parallel.

The conversion reactor may comprise any number of filtration units themselves comprising any number of filters.

For a plant comprising at least one filtration unit comprising a plurality of filters arranged in parallel, the arrangement of injecting inert declogging gas comprises an injection nozzle placed in axial alignment with each of the filters of the plurality of filters.

Instead of solenoid valves, it is possible to use any other type of automatic control valve for distributing the declogging gas in the declogging nozzles, whether individually or in groups.

For existing industrial plants, it is possible to substantially increase the hourly output of the uranium hexafluoride conversion plant, by using a declogging method according to the invention.

For plants according to other designs, the hexafluoride output had to be limited to a hexafluoride output of less than 100 kg/h and generally close to 75 kg/h. For plants having a declogging device according to the invention, twice the output can be treated, that is to say 150 kg/h.

What is claimed is:

1. A method of declogging at least one filter of a plant for producing uranium oxide from uranium hexafluoride comprising:
    injecting gaseous hexafluoride $UF_6$ and steam into a reactor;
    forming uranium oxyfluouride $UO_2F_2$ in powder form and gaseous hydrofluoric acid HF;
    separating uranium oxyfluoride $UO_2F_2$ conveyed by gases containing gaseous hydrofluroic acid HF in an outlet part of the reactor in at least one filtration unit having at least one filter having a tubular filtration wall arranged with an axis vertical; and
    evacuating a gas containing hydrofluoric acid to the outside of the reactor, wherein the declogging of the filter comprises:
    separating uranium oxyfluoride $UO_2F_2$ from the wall of the filter by a stream of inert gas injected into the filter counter-currentwise to a flow of the evacuated gas containing the hydrofluoric acid HF, wherein the inert gas is injected along the axis of the wall of the filter in a form of a jet with a velocity greater than 300 m/s for a duration of less than 1 second, wherein a nozzle is configured to inject the inert gas, the nozzle aligned with the vertical axis of the wall of the filter, the nozzle connected by a pipe for feeding the inert declogging gas to at least one distribution element.

2. The method according to claim 1, wherein the inert declogging gas jet has a velocity greater than 330 m/s.

3. The method according to claim 1, wherein the duration of injecting inert declogging gas into the at least one filter is between 0.1 and 0.5 seconds, the inert gas being at an approximately 130° C. and at an initial pressure of between 2 and 10 bar.

4. The method according to claim 1, wherein the individual injections of inert declogging gas are performed, along the axis of the wall of the filter inside each of a plurality of filters of a filtration unit.

5. The method according to claim 4, wherein for a plant comprising at least one filtration unit having N filters arranged in parallel, declogging is performed in successive groups of n filters (where n<N) of each of the filtration units.

6. The method according to claim 4, wherein declogging is performed by injecting the inert gas successively into each of the filters of each of at least one filtration unit of the reactor.

7. A device for declogging at least one filter of a plant for producing uranium oxide from uranium hexafluoride, comprising:
    a reactor including a jacket having a generally vertical arrangement;
    a pipe for injecting uranium hexafluoride, steam and dilution gas entering the jacket of the reactor together with at least one unit for filtering gases evacuated from the reactor having a manifold connected to a pipe for evacuating gases to outside the reactor in which emerges an outlet end of at least one filter having a tubular wall with a vertical axis supported by a plate separating the gas manifold from an inner space of the jacket of the reactor in which the filter is placed, the declogging device having a reservoir for storing pressurized inert declogging gas; and an arrangement configured to distribute and route inert declogging gas toward the at least one filter of the at least one filtration unit of the reactor, wherein a nozzle configured to inject inert gas aligned with the vertical axis of the wall of the filter, the nozzle connected by a pipe for feeding inert declogging gas to at least one distribution element.

8. The device according to claim 7, wherein the nozzle configured to inject declogging gas is arranged in the manifold of the filtration unit, opposite an outlet end of the filter; and a flange for supporting and fastening the filter resting on the plate of the manifold is configured with a through-opening coaxial with the nozzle and has a venturi for accelerating the declogging gas injected into the filter along the axial direction via the nozzle.

9. The device according to claim 7, wherein the nozzle is arranged inside and close to a central part of the tubular part of the filter.

10. The device according to claim 7, wherein the nozzle has a shape of a convergent-divergent pipe.

11. The device according to claim 7, wherein the at least one filtration unit has a plurality of filters arranged in parallel, wherein the declogging gas injection arrangement has an injection nozzle placed in axial alignment with the jacket of the filter associated with each of the filters of the at least one filtration unit.

12. The device according to claim 11, wherein each of the nozzles of arrangement for declogging a filter is connected via a feed pipe to an individual arrangement for distributing inert declogging gas having an individual automatic control valve.

13. The device according to claim 11, wherein each of the nozzles of each of the arrangements for injecting declogging gas into a filter is connected via a pipe to a distribution arrangement configured to ensure a simultaneous feeding of n nozzles out of N nozzles of a filtration unit, wherein n is one of less than and equal to N.

* * * * *